(12) United States Patent
Moribe et al.

(10) Patent No.: US 11,588,956 B2
(45) Date of Patent: Feb. 21, 2023

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Shoei Moribe, Kanagawa (JP); Hisashi Ishikawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/375,570

(22) Filed: Jul. 14, 2021

(65) Prior Publication Data

US 2022/0030136 A1    Jan. 27, 2022

(30) Foreign Application Priority Data

Jul. 21, 2020  (JP) .............................. JP2020-124642

(51) Int. Cl.
*H04N 1/60*  (2006.01)
*H04N 1/50*  (2006.01)

(52) U.S. Cl.
CPC ......... *H04N 1/6027* (2013.01); *H04N 1/6008* (2013.01); *H04N 1/50* (2013.01)

(58) Field of Classification Search
CPC ...... H04N 1/6027; H04N 1/6008; H04N 1/50; H04N 1/52
See application file for complete search history.

(56) References Cited

U.S. PATENT DOCUMENTS

| 5,111,310 A * | 5/1992 | Parker .................. | H04N 1/4051 |
| | | | 358/3.19 |
| 6,250,733 B1 * | 6/2001 | Yao .......................... | H04N 1/56 |
| | | | 358/1.9 |

(Continued)

FOREIGN PATENT DOCUMENTS

| JP | 2012216933 A | * 11/2012 | ......... G06K 15/1881 |
| JP | 2012216933 A | 11/2012 | |

OTHER PUBLICATIONS

Extended European Search Report issued by the European Patent Office dated Dec. 22, 2021 in corresponding EP Patent Application No. 21184177.0.

*Primary Examiner* — Ted W Barnes
(74) *Attorney, Agent, or Firm* — Carter, DeLuca & Farrell LLP

(57) ABSTRACT

An apparatus comprises a unit configured to generate gradation data corresponding to an achromatic color generated by combining two or more colors among a plurality of colors, for an excess amount of a total gradation value exceeding a predetermined value, the total gradation value being a sum of gradation values of the plurality of colors used for recording a pixel of interest, and generate gradation data corresponding to the plurality of colors, based on the generated gradation data corresponding to the achromatic color; and a unit configured to quantize the generated gradation data, and generate data to control recording of dots corresponding to the pixel of interest. The predetermined value is a gradation value indicating whether or not to record the dots in an overlapping manner, in case that the dots corresponding to the total gradation value are recorded.

11 Claims, 14 Drawing Sheets

(56) References Cited

U.S. PATENT DOCUMENTS

| | | | |
|---|---|---|---|
| 6,867,884 B1 * | 3/2005 | Rozzi | H04N 1/52 358/1.9 |
| 9,201,839 B2 | 12/2015 | Hara et al. | |
| 9,462,091 B2 | 10/2016 | Hara et al. | |
| 9,485,388 B2 | 11/2016 | Kodama et al. | |
| 9,661,181 B2 * | 5/2017 | Kato | H04N 1/52 |
| 9,734,439 B2 | 8/2017 | Hara et al. | |
| 9,749,496 B2 | 8/2017 | Fujimoto et al. | |
| 9,894,250 B2 | 2/2018 | Moribe | |
| 10,026,156 B2 | 7/2018 | Moribe | |
| 10,027,848 B2 | 7/2018 | Fuse et al. | |
| 10,043,118 B2 | 8/2018 | Sumi et al. | |
| 10,057,459 B2 | 8/2018 | Yamamoto et al. | |
| 10,063,743 B2 | 8/2018 | Fuse et al. | |
| 10,073,370 B2 | 9/2018 | Takikawa et al. | |
| 10,165,153 B2 * | 12/2018 | Kajiwara | G06K 15/02 |
| 10,187,553 B2 | 1/2019 | Takesue et al. | |
| 10,194,053 B2 | 1/2019 | Otani et al. | |
| 10,205,854 B2 | 2/2019 | Shimada et al. | |
| 10,356,282 B2 | 7/2019 | Ochiai et al. | |
| 10,462,333 B2 * | 10/2019 | Kajiwara | G06K 15/1872 |
| 10,506,135 B2 | 12/2019 | Moribe et al. | |
| 10,523,844 B2 | 12/2019 | Moribe et al. | |
| 10,545,446 B2 | 1/2020 | Takikawa et al. | |
| 10,638,020 B2 | 4/2020 | Ochiai et al. | |
| 10,733,488 B2 * | 8/2020 | Takesue | H04N 1/4057 |
| 10,831,121 B2 | 11/2020 | Yanai et al. | |
| 10,834,288 B2 * | 11/2020 | Hashioka | G06K 15/1881 |
| 10,855,877 B2 | 12/2020 | Takesue et al. | |
| 10,896,358 B2 * | 1/2021 | Kikuta | H04N 1/00167 |
| 11,020,985 B2 * | 6/2021 | Otani | B41J 2/04593 |
| 2012/0249646 A1 * | 10/2012 | Tsuboi | B41J 2/2107 347/15 |
| 2012/0250096 A1 * | 10/2012 | Hakamada | H04N 1/4053 358/3.13 |
| 2019/0052775 A1 * | 2/2019 | Suzuki | H04N 1/52 |
| 2020/0045208 A1 * | 2/2020 | Doi | H04N 1/52 |
| 2020/0079102 A1 | 3/2020 | Ochiai et al. | |
| 2020/0130353 A1 | 4/2020 | Moribe | |
| 2020/0156386 A1 | 5/2020 | Otani et al. | |
| 2020/0184289 A1 * | 6/2020 | Takesue | G06K 15/1878 |
| 2020/0198365 A1 | 6/2020 | Ochiai et al. | |
| 2020/0349405 A1 * | 11/2020 | Otani | G06K 15/102 |
| 2021/0006758 A1 | 1/2021 | Moribe | |
| 2021/0158112 A1 | 5/2021 | Otani et al. | |
| 2021/0303950 A1 | 9/2021 | Takesue et al. | |
| 2021/0303952 A1 | 9/2021 | Takesue et al. | |

* cited by examiner

F I G. 11

| | COLOR ELEMENT | NUMBER OF ELEMENTS |
|---|---|---|
| 0 | W | 1 TYPE |
| 1 | C,M,Y,K | 4 TYPE |
| 2 | CM,CY,CK,MY,MK,YK | 6 TYPE |
| 3 | CMY,CMK,CYK,MYK | 4 TYPE |
| 4 | CMYK | 1 TYPE |

| | W | Y | M | C | CMY | MY | CY | CM | K | YK | MK | CK | MYK | CYK | CMK | CMYK |
|---|---|---|---|---|---|---|---|---|---|---|---|---|---|---|---|---|
| − | 4095 | 0 | 0 | 0 | 0 | 0 | 0 | 0 | 0 | 0 | 0 | 0 | 0 | 0 | 0 | 0 |
| K | 1795 | 0 | 0 | 0 | 0 | 0 | 0 | 0 | 2300 | 0 | 0 | 0 | 0 | 0 | 0 | 0 |
| C | 195 | 0 | 0 | 1600 | 0 | 0 | 0 | 0 | 2300 | 0 | 0 | 0 | 0 | 0 | 0 | 0 |
| M | 0 | 0 | 195 | 695 | 0 | 0 | 0 | 905 | 2300 | 0 | 0 | 0 | 0 | 0 | 0 | 0 |
| Y | 0 | 0 | 195 | 695 | 600 | 0 | 0 | 305 | 2300 | 0 | 0 | 0 | 0 | 0 | 0 | 0 |

1301, 1302, 1303, 1304, 1305

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a quantization technique of gradation data.

Description of the Related Art

When recording an image using pseudo-gradation, it is necessary to quantize a multi-value image. Error diffusion and dithering are known as quantization methods used to perform image recording. In particular, the dithering, which compares a gradation value of multi-value data with a preliminarily stored threshold value to determine whether or not to record a dot, requires a smaller processing load than the error diffusion and therefore is used in many image processing apparatuses. Although dot dispersibility arises as a problem in the dithering as described above, in U.S. Pat. No. 5,111,310 for example, there is proposed a method that uses a threshold value matrix having blue noise characteristics, as a threshold value matrix for acquiring desirable dot dispersibility.

In addition, U.S. Pat. No. 6,867,884 discloses a dithering for solving the problem that graininess becomes noticeable due to the reduced dispersibility when recording an image with a plurality of color materials (i.e., color mixing), despite that a desirable dispersibility has been acquired in individual color materials (i.e., single color). Specifically, there is disclosed a method that prepares a common threshold value matrix having desirable dispersibility and that performs a quantization process while shifting respective threshold values between a plurality of colors. In the present specification, such a quantization method will be referred to as inter-color processing, hereafter. According to inter-color processing, dots of different colors in a low gradation part are recorded in a mutually-exclusive and highly-dispersed state, whereby a desired image quality can also be realized in a mixed color image.

However, although quantization of inter-color processing as described in U.S. Pat. No. 6,867,884 (quantization that suppresses overlapping of ink colors) improves granularity, there may occur an image quality defect called color shift. Color shift refers to a phenomenon in which a part of gradation turns out to be colored when forming an achromatic gradation image using color inks such as C (Cyan), M (Magenta), and Y (Yellow). In usual quantization, dot patterns of C, M, and Y are uncorrelated and therefore it is possible to suppress color shift by adjusting the ink amount of C, M, and Y. In the aforementioned inter-color processing, on the other hand, the way of overlapping of C-, M-, and Y-dots varies due to threshold value cyclic processing performed when the total value of respective ink colors exceeds the maximum value of the threshold value, making the relation between the ink amount and color development complicated. Accordingly, it has been difficult to suppress color shift in inter-color processing.

SUMMARY OF THE INVENTION

The present invention provides a technique for suppressing color shift in a quantization process that suppresses color overlapping.

According to the first aspect of the present invention, there is provided an image processing apparatus comprising: a first generating unit configured to generate gradation data corresponding to an achromatic color generated by combining two or more colors among a plurality of colors, for an excess amount of a total gradation value exceeding a predetermined value, the total gradation value being a sum of gradation values of the plurality of colors used for recording a pixel of interest, and generate gradation data corresponding to the plurality of colors, based on the generated gradation data corresponding to the achromatic color; and a second generating unit configured to quantize the gradation data generated by the first generating unit, and generate data to control recording of dots corresponding to the pixel of interest, wherein the predetermined value is a gradation value indicating whether or not to record the dots in an overlapping manner, in case that the dots corresponding to the total gradation value are recorded.

According to the second aspect of the present invention, there is provided an image processing method performed by an image processing apparatus, comprising: generating gradation data corresponding to an achromatic color generated by combining two or more colors among a plurality of colors, for an excess amount of a total gradation value exceeding a predetermined value, the total gradation value being a sum of gradation values of the plurality of colors used for recording a pixel of interest, and generating gradation data corresponding to the plurality of colors, based on the generated gradation data corresponding to the achromatic color; and quantizing the gradation data generated, and generating data to control recording of dots corresponding to the pixel of interest, wherein the predetermined value is a gradation value indicating whether or not to record the dots in an overlapping manner, in case that the dots corresponding to the total gradation value are recorded.

According to the third aspect of the present invention, there is provided a non-transitory computer-readable storage medium storing a computer program that causes a computer to function as: a first generating unit configured to generate gradation data corresponding to an achromatic color generated by combining two or more colors among a plurality of colors, for an excess amount of a total gradation value exceeding a predetermined value, the total gradation value being a sum of gradation values of the plurality of colors used for recording a pixel of interest, and generate gradation data corresponding to the plurality of colors, based on the generated gradation data corresponding to the achromatic color; and a second generating unit configured to quantize the gradation data generated by the first generating unit, and generate data to control recording of dots corresponding to the pixel of interest, wherein the predetermined value is a gradation value indicating whether or not to record the dots in an overlapping manner, in case that the dots corresponding to the total gradation value are recorded.

Further features of the present invention will become apparent from the following description of exemplary embodiments with reference to the attached drawings.

BRIEF DESCRIPTION OF THE DRAWINGS

FIG. 11 illustrates a combination of multi-order color data.

FIG. 13 illustrates progress and results of multi-order color conversion.

DESCRIPTION OF THE EMBODIMENTS

Figure 1:
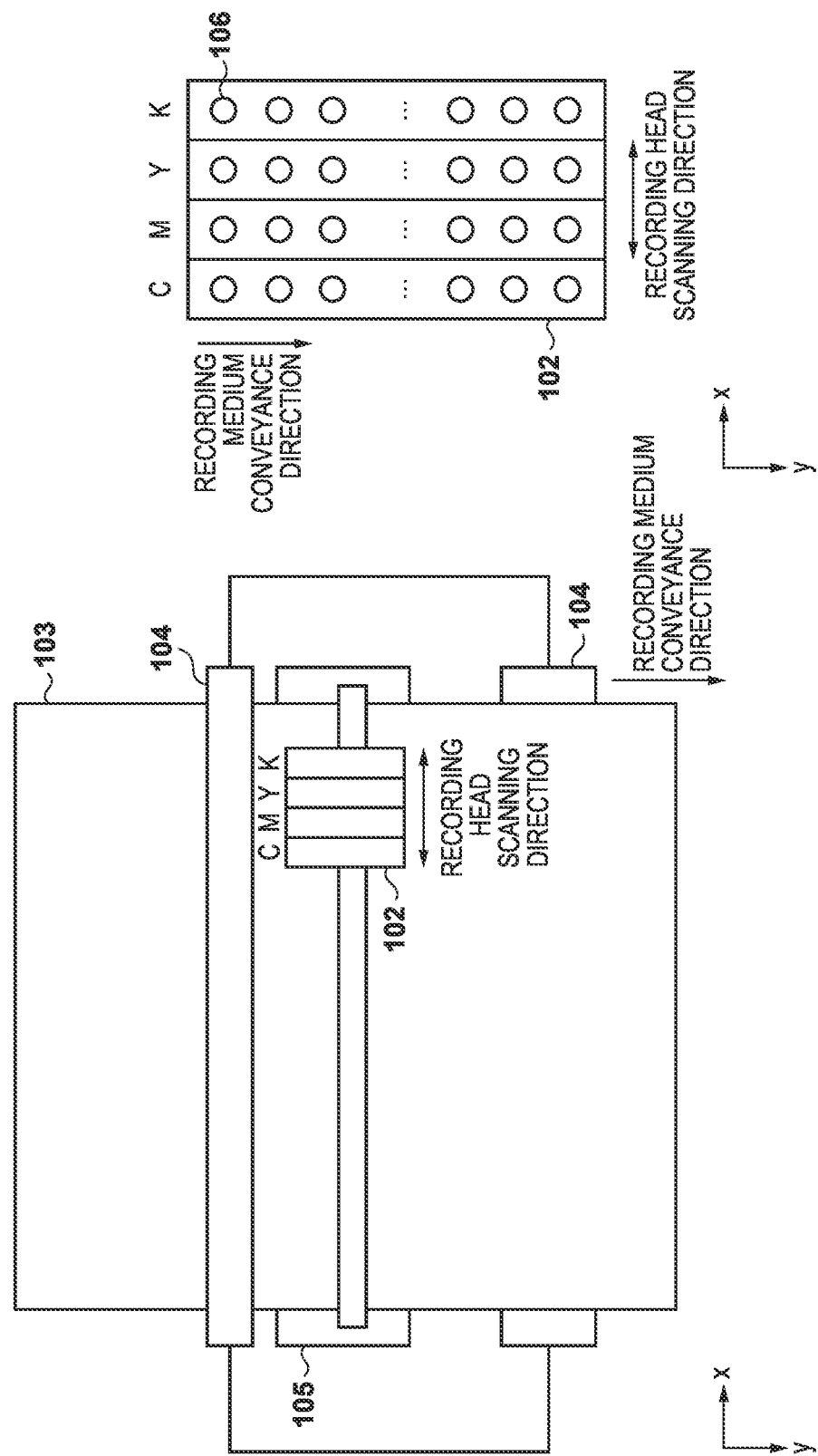
FIG. 1A illustrates a configuration example of a recording apparatus.
FIG. 1B illustrates a configuration example of a recording head 102.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Configuration of Recording Apparatus>

First, a recording apparatus according to the present embodiment will be described, referring to FIG. 1A. The recording apparatus according to the present embodiment is a printer which is an inkjet recording apparatus, and FIG. 1A schematically illustrates a printer according to the present embodiment. The printer of FIG. 1A is a serial type recording apparatus, comprising a recording head 102.

A configuration example of the recording head 102 is illustrated in FIG. 1B. The recording head 102 has recording heads that discharge four ink colors (color materials) of Cyan (C), Magenta (M), Yellow (Y), and Black (K). More specifically, the recording head 102 has a nozzle row (recording element row) 106 for each of the colors C, M, Y, and K, in which nozzles that can discharge ink droplets of the corresponding color are arranged in the y-direction (recording medium conveyance direction). In addition, each of the nozzle rows is arranged in the x-direction in the drawing (recording head scanning direction). Although the nozzles are arranged in one row in the y-direction (recording medium conveyance direction) in FIG. 1B, the number and arrangement of nozzles are not limited to those illustrated in FIG. 1B. For example, there may be provided a row of nozzles that discharge an identical color but different amount of ink, or there may be a plurality of rows of nozzles that discharge an identical amount, or there may be a row of nozzles arranged in a zigzag manner.

A platen 105, provided at a recording position facing a surface (discharge surface) having a discharge port of the recording head 102 formed thereon, supports the back surface of a recording medium 103, so as to maintain the distance between the surface of the recording medium 103 and the ink discharge surface at a constant distance. The recording medium 103 conveyed over the platen 105 and subjected to recording thereon is conveyed in the y-direction by rotation of a conveyance roller 104 (and other rollers not illustrated) by driving force of a motor (not illustrated).

<Configuration of Recording System>

Figure 2:
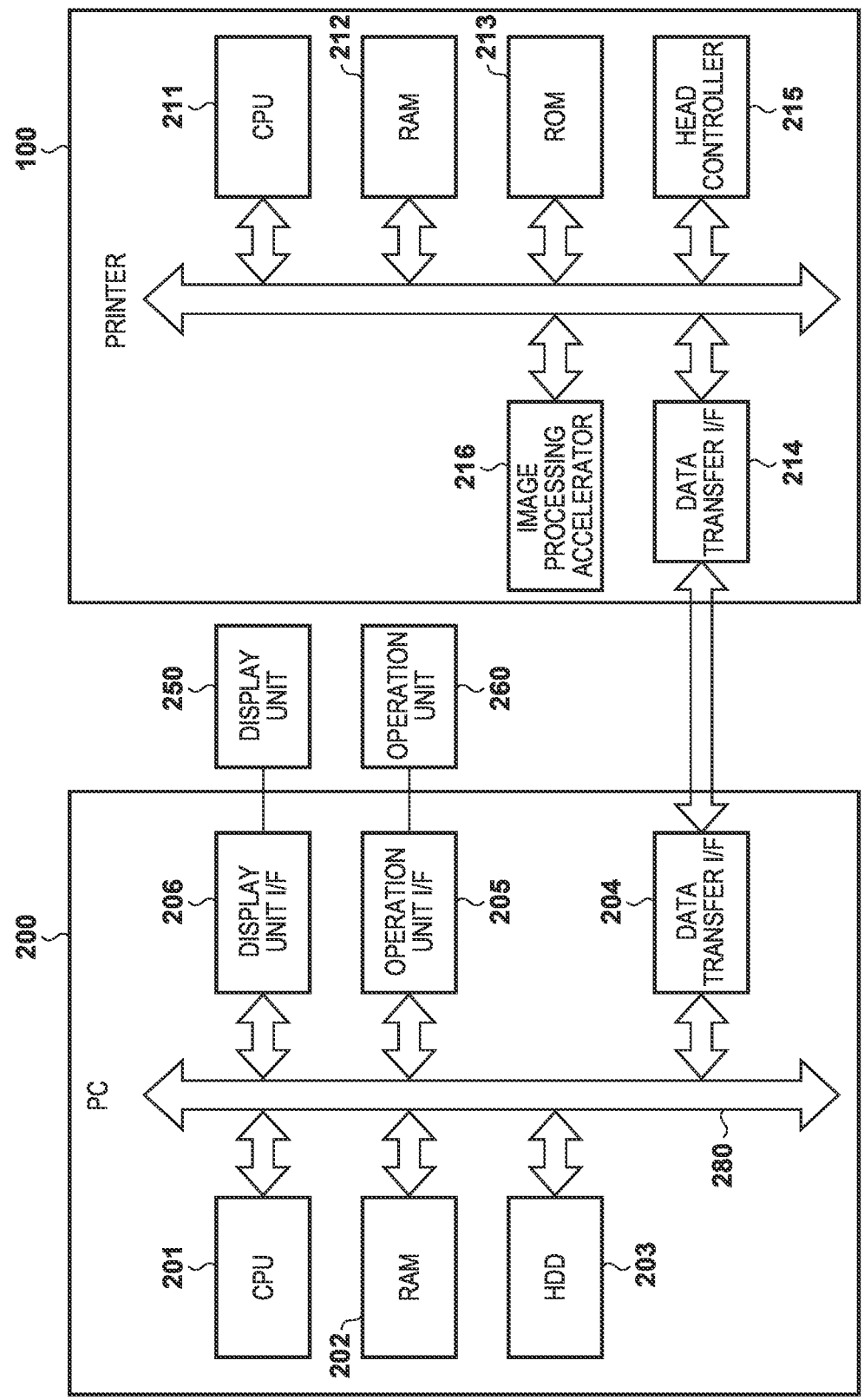
FIG. 2 is a block diagram illustrating a configuration example of a recording system.

Next, there will be described, referring to the block diagram of FIG. 2, a configuration example of a recording system having: the printer illustrated in FIGS. 1A and 1B; and a PC (personal computer) that serves as a host device of the printer. A PC 200 and a printer 100 are connected via a wireless and/or wired network, and the PC 200 and the printer 100 are configured to allow for data communication with each other via the network.

First, the PC 200 will be described.

A CPU 201 performs various processes using computer programs and data stored in a RANI 202. Accordingly, the CPU 201 controls the operation of the PC 200 as a whole, and also performs or controls various processes described to be performed by the PC 200.

The RANI 202 has: an area for storing computer programs and data loaded from an HDD (hard disk drive) 203; and an area for storing data received from the printer 100 via a data transfer I/F 204. In addition, the RANI 202 has a work area to be used when the CPU 201 performs various processes. As has been described above, the RAM 202 can provide various areas as appropriate.

The HDD 203 stores computer programs and data for causing the CPU 201 to perform or control the operating system (OS) or various processes described to be performed by the PC 200. The computer programs and data stored in the HDD 203 are loaded to the RANI 202 as appropriate according to control of the CPU 201 and are to be processed by the CPU 201.

A display unit I/F 206 is an interface for connecting a display unit 250 to the PC 200. The display unit 250, having a liquid crystal screen or a touch panel screen, displays a result of processing by the CPU 201 in the form of images, characters, or the like. Here, the display unit 250 may be integrated with the PC 200. In addition, the display unit 250 may be a projection device such as a projector that projects images or characters.

An operation unit I/F 205 is an interface for connecting an operation unit 260 to the PC 200. An operation unit 260, which is a human interface device (HID) such as a keyboard, a mouse, a touch panel screen, or the like, allows for inputting various instructions to the CPU 201 via user operation.

The data transfer I/F 204 is an interface for connecting the PC 200 to the aforementioned network. USB, IEEE 1394, LAN, or the like, can be used as connection methods for performing data transmission and reception between the PC 200 and the printer 100.

The CPU 201, the RANI 202, the HDD 203, the display unit I/F 206, the operation unit I/F 205, and the data transfer I/F 204 are all connected to a system bus 280. Here, the configuration of PC 200 is not limited to that illustrated in FIG. 2, and any configuration may be used, provided that it can perform each of the processes described to be performed by the PC 200.

Next, the printer 100 will be described.

A CPU 211 performs various processes using computer programs and data stored in a RANI 212 and a ROM 213. Accordingly, the CPU 211 controls the operation of the printer 100 as a whole, and also performs or controls various processes described to be performed by the printer 100.

The RANI 212 has: an area for storing computer programs and data loaded from the ROM 213; and an area for storing data received from the PC 200 via a data transfer I/F 214. Furthermore, the RANI 212 has a work area to be used when the CPU 211 performs various processes. As has been described above, the RANI 212 can provide various areas as appropriate.

The ROM 213 has stored therein setting data of the printer 100, computer programs and data related to activation of the printer 100, computer programs and data related to the basic operation of the printer 100, or the like.

A head controller 215 supplies recording data to each of the nozzle rows included in the recording head 102, and also controls discharge operation of the recording head 102. Specifically, the head controller 215 reads control parameters and recording data from a predetermined address in the RANI 212. Subsequently, the CPU 211 writes the control parameter and the recording data to a predetermined address in the RAM 212, thereby activating a process by the head controller 215 to perform ink discharge from the recording head 102.

An image processing accelerator 216 is a hardware that can perform image processing faster than the CPU 211. Specifically, the image processing accelerator 216 reads parameters and data required for image processing from a predetermined address of the RANI 212. Subsequently, the CPU 211 writes the parameters and data to the predetermined address in the RAM 212, thereby activating the image processing accelerator 216, by which in turn the image processing accelerator 216 performs predetermined image processing on the data. Here, the image processing accelerator 216 is not an essential element, and therefore image processing may be performed only by processing by the CPU 211 in accordance with specification or the like of the printer. Here, the configuration of the printer 100 is not limited to that illustrated in FIG. 2, and any configuration may be used, provided that it can perform each of the processes described to be performed by the printer 100.

<Processing on Input Image>

Figure 3:
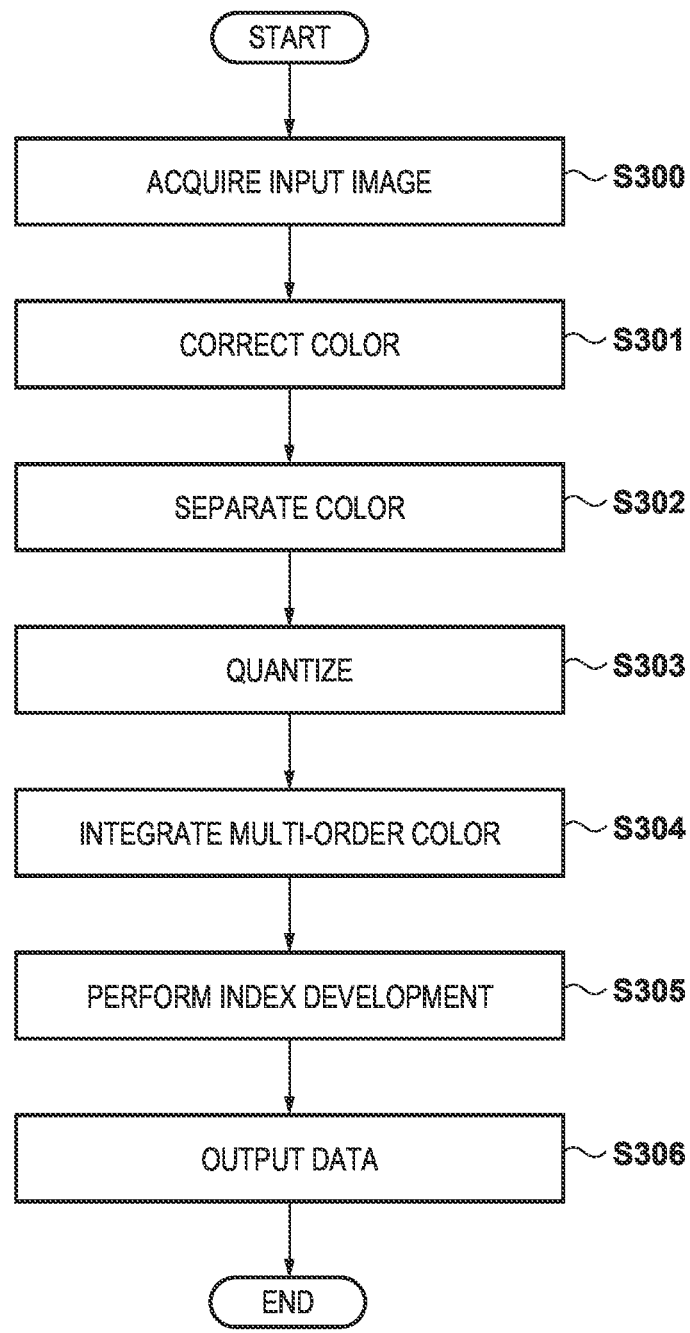
FIG. 3 is a flowchart of a process performed by the recording system.

Next, a process, on an input image, to be performed by the recording system according to the present embodiment will be described, referring to the flowchart of FIG. 3.

At step S300, the CPU 201 of the PC 200 acquires an input image. The input image may be acquired from the HDD 203 and loaded into the RANI 202 or may be acquired from the outside and loaded into the RAM 202 via a network (not illustrated), the acquisition method being not limited to any specific acquisition method.

At step S301, the CPU 201 of the PC 200 performs color correction on the input image acquired at step S300. In the present embodiment, the input image is assumed to be an 8-bit RGB input image whose color space is represented by a normalized color space such as sRGB. Here, an 8-bit RGB input image is an input image in which each pixel has an 8-bit luminance value of the R (Red) component, an 8-bit luminance value of the G (Green) component, and an 8-bit luminance value of the B (Blue) component. At step S301, such an input image is converted into an 12-bit RGB input image corresponding to a color space inherent to the printer 100 (an input image in which each pixel has a 12-bit luminance value of the R component, a 12-bit luminance value of the G component, and a 12-bit luminance value of the B component). The method for converting the luminance value can be realized by employing a known method such as referring to a lookup table (LUT) preliminarily stored in the HDD 203 or the like.

At step S302, the CPU 201 of the PC 200 separates (ink color separation) the 12-bit RGB input image converted at step S301 into 16-bit gradation data (density data) of each of ink colors C, M, Y, and K of the printer 100. In other words, at step S302, a 12-bit RGB input image is separated into four-channel images (an image representing, in 16 bits, the gradation (density) of the C component of each pixel of the 12-bit RGB input image; an image representing, in 16 bits, the gradation (density) of the M component of each pixel of the 12-bit RGB input image; an image representing, in 16 bits, the gradation (density) of the Y component of each pixel of the 12-bit RGB input image; and an image representing, in 16 bits, the gradation (density) of the K component of each pixel of the 12-bit RGB input image). Also ink color separation can be realized by using a known method such as referring to a lookup table (LUT) preliminarily stored in the HDD 203 or the like, similarly to the aforementioned color correction. The CPU 201 of the PC 200 then transmits the four-channel images (CMYK data) to the printer 100 via the data transfer I/F 204.

At step S303, the CPU 211 of the printer 100 receives, into the RAM 212, the CMYK data transmitted from the PC 200 via the data transfer I/F 214. The CPU 211 of the printer 100 performs a quantization process on the received CMYK data. The CMYK data is converted into data of multi-order color (multi-order color data) and subsequently quantized. The term "multi-order color" mentioned in the present embodiment is intended to mean: a primary color of C, M, Y, and K; and a tertiary color recorded by superimposing ink C, M, and Y. In the following, the aforementioned tertiary color will be denoted as CMY. CMY is achromatic. The multi-order color data subjected to the quantization process becomes 2-bit data from level 0 to level 2, in a case of quantization into three values, for example. Details of the quantization process will be described below.

Next, at step S304, the CPU 211 of the printer 100 integrates each of the quantized multi-order color data (multi-order color integration) and converts them into CMYK data. Details of the multi-order color integration will be described below.

At step S305, the CPU 211 of the printer 100 performs an index development process on the CMYK data acquired in the process at step S304. Specifically, from a plurality of dot arrangement patterns defining the number and the position of dots to be recorded in individual pixels, a dot arrangement pattern corresponding to a level value of a pixel of interest is selected, as a dot arrangement pattern defining the number and the position of dots to be recorded in the pixel of interest. On this occasion, the dot arrangement pattern may be such that the number of dots to be recorded in a region corresponding to individual pixels differs depending on the level value, or such that the dot size differs depending on the level value. Such an index development process is performed for each of C, M, Y, and K. Subsequently, upon completion of the aforementioned index development process, the process flow proceeds to step S306.

At step S306, the CPU 211 of the printer 100 outputs, to the RANI 212 as binary data, dot data having dots arranged in accordance with the dot arrangement pattern for each pixel. The head controller 215 supplies the aforementioned recording data based on such binary data to each of the nozzle rows included in the recording head 102, and also controls discharge operation performed by the recording head 102.

Although the foregoing explanation has described the processes from steps S300 to S302 to be performed by the PC 200, and the processes from steps S303 to S306 to be performed by the printer 100, the entity supposed to perform the processes at respective steps is not limited to that in the foregoing explanation. For example, the processes from steps S300 to S303 may be performed by the PC 200. In this case, the PC 200 transmits a result of quantization to the printer 100 at step S303, and the printer 100 receives the result of quantization at step S304. Subsequent operation performed by the printer 100 is similar to the foregoing explanation. In addition, for example, the printer 100 may perform the processes from steps S301 to S306, depending on the performance of the printer 100. In this case, the PC 200 transmits the acquired input image to the printer 100 at step S300.

<Quantization Process>

Next, there will be described the quantization process performed at step S303 as described above. There will be described a functional configuration example of the printer 100 according to the quantization process performed at S303, referring to the block diagram of FIG. 4. In the following, although the functional units illustrated in FIG. 4 will be described as the main entity of the process, actually a function of a functional unit is realized by executing, by the CPU 211, a computer program for causing the CPU 211 to perform or control the function of the functional unit. The functional units illustrated in FIG. 4 may be implemented in hardware. In the quantization process according to the present embodiment, a process relating to the input value is first performed, then a process relating to a threshold value is performed, and finally a quantization process is performed according to the dithering.

Figure 4:
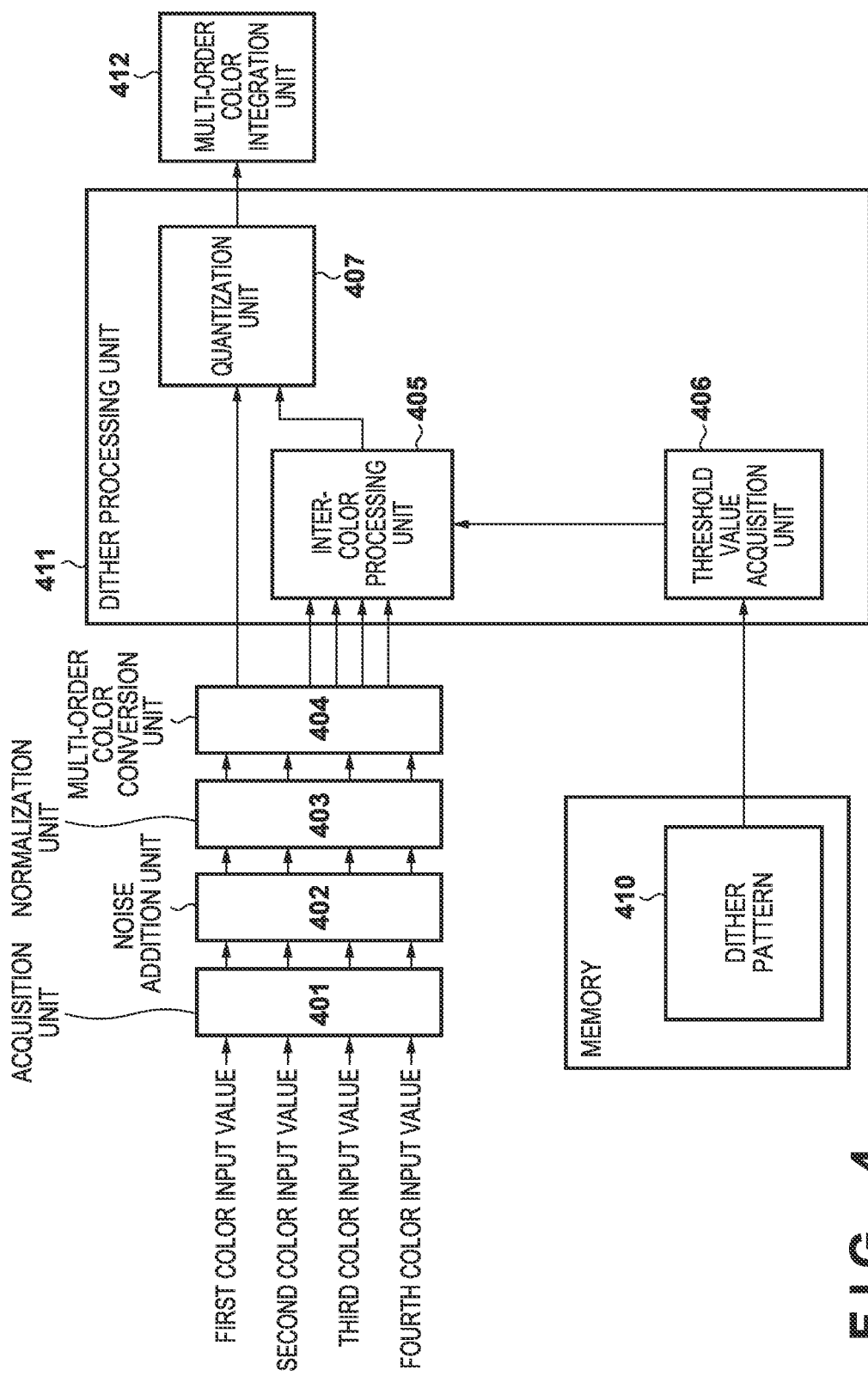
FIG. 4 is a block diagram illustrating a functional configuration example of a printer 100 according to a quantization process.

An acquisition unit 401 acquires 16-bit gradation data indicating densities of individual pixels. It is assumed that the acquisition unit 401 of the present embodiment can acquire a maximum of 16-bit gradation data for as many as eight colors. FIG. 4 illustrates a state in which 16-bit gradation data of each of the first to the fourth colors are input as the first to the fourth color input values. In other words, FIG. 4 illustrates a state in which gradation data of pixels in the C-channel image (first color input value), gradation data of pixels in the M-channel image (second color input value), gradation data of pixels in the Y-channel image (third color input value), and gradation data of pixels in the K-channel image (fourth color input value) are input to the acquisition unit 401.

A noise addition unit 402 adds predetermined noise to each of the first color input value, the second color input value, the third color input value, and the fourth color input value (16-bit gradation data). Adding noise to gradation data allows for avoiding successively arranging an identical pattern even when gradation data of an identical level are successively input, thereby mitigating lines, textures or the like. The noise addition unit 402 multiplies fluctuation intensities respectively depending on a predetermined random table, a fixed intensity, and gradation data, whereby noise is generated for each pixel and added to the gradation data.

Here, the random table, which is a table for setting positive or negative noise, has positive, zero, or negative noise set to each pixel position. The present embodiment can have a maximum of eight random tables, each size of which can be freely selected. A fixed intensity indicates the intensity of the noise amount, and the noise amount is determined based on the intensity. The present embodiment allows appropriate adjustment of the amount of noise by setting an optimal random table or a fixed intensity for each print mode, in accordance with the degree of granularity and lines or textures of the image. Here, the method of adding noise to the gradation data is not limited to a specific addition method.

A normalization unit 403 divides the 16-bit range 0 to 65535 into a plurality of divided ranges. Subsequently, the normalization unit 403 associates, with respective pixels of the first color input value, the second color input value, the third color input value, and the fourth color input value, a value of a level (level value allowing index development at step S305) corresponding to the divided range including the color input value (gradation value).

For example, in a case where the index development process at step S305 is a process corresponding to n values from level 0 to level (n−1), the normalization unit 403 divides 65535 gradations of a 16-bit range into (n−1) equal parts. Subsequently, the normalization unit 403 associates, with the pixel of the first color input value, the level value of a level corresponding to a divided range including the gradation value corresponding to the first color input value, among each of the (n−1) equally divided ranges. In addition, the normalization unit 403 associates, with the pixel of the second color input value, the level value of a level corresponding to the divided range including the gradation value corresponding to the second color input value, among each of the (n−1) equally divided ranges. In addition, the normalization unit 403 associates, with the pixel of the third color input value, the level value of a level corresponding to the divided range including the gradation value corresponding to the third color input value, among each of the (n−1) equally divided ranges. In addition, the normalization unit 403 associates, with the pixel of the fourth color input value, the level value of a level corresponding to the divided range including a gradation value corresponding to the fourth color input value, among each of the (n−1) equally divided ranges.

Furthermore, the normalization unit 403 normalizes each divided range into 12 bits (4096 gradations). Accordingly, for pixels of each of the first color input value, the second color input value, the third color input value, and the fourth color input value, there is acquired a 12-bit color input value (12-bit gradation data) corresponding to each color input value in a normalized divided range, acquired by normalizing a divided range including the color input value to 12 bits (4096 gradations). The aforementioned control allows for performing the subsequent quantization process by a similar process, regardless of the number (n) of quantization.

The processes by the acquisition unit 401, the noise addition unit 402, and the normalization unit 403 described above are performed in parallel for gradation data of each color. In other words, 12-bit gradation data for cyan, magenta, yellow, and black are generated and input to the multi-order color conversion unit 404 in the present embodiment.

The multi-order color conversion unit 404 converts the 12-bit gradation data of C, M, Y, and K output from the normalization unit 403 into multi-order color data. As has been described above, the multi-order color data, which is data of primary colors C, M, Y, and K and data of a tertiary color CMY, turns out to be five types of data (five colors). Details of the conversion performed by the multi-order color conversion unit 404 will be described below. Subsequently, the multi-order color conversion unit 404 outputs the multi-order color data of the five colors to a dither processing unit 411.

The dither processing unit 411 provide the quantization unit 407 with the multi-order color data of the color to be quantized (data to be processed), among the multi-order color data of the five colors (12-bit data of each of C, M, Y, and K, and 12-bit data of CMY) input from the multi-order color conversion unit 404. In addition, the dither processing unit 411 provides, as reference data, the inter-color processing unit 405 with the multi-order color data other than the data to be processed, among the multi-order color data of the five colors input from the multi-order color conversion unit 404.

The inter-color processing unit 405 determines a final threshold value by performing, on the threshold value acquired by a threshold value acquisition unit 406, a predetermined process based on the reference data, and outputs the determined threshold value to the quantization unit 407.

The quantization unit 407 compares the data to be processed with the threshold value output from the inter-color processing unit 405, and outputs "to be recorded (1)" or "not to be recorded (0)" as a quantization result (quantization data) for the data to be processed.

The threshold value acquisition unit 406 selects a corresponding one of the threshold value matrices from a plurality of dither patterns (threshold value matrices) 410 stored in a memory such as the ROM 213, and acquires, from the selected threshold value matrix, a threshold value corresponding to the pixel position of the data to be processed. In the present embodiment, the dither pattern 410, which is a two-dimensional matrix arranged so that threshold values of 0 to 4094 have blue noise characteristics, has various sizes and shapes such as 512×512 pixels, 256×256 pixels, 512×256 pixels, or the like. In other words, the threshold value acquisition unit 406 selects a threshold value matrix corresponding to the print mode and the ink color from the memory having preliminarily stored therein a plurality of threshold value matrices having different sizes and shapes. Subsequently, the threshold value acquisition unit 406 acquires a threshold value corresponding to the pixel position (x, y) of the data to be processed among a plurality of threshold values arranged in two dimensions in the selected threshold value matrix, and outputs the acquired threshold value to the inter-color processing unit 405.

<Multi-Order Color Conversion Process>

Figure 6:
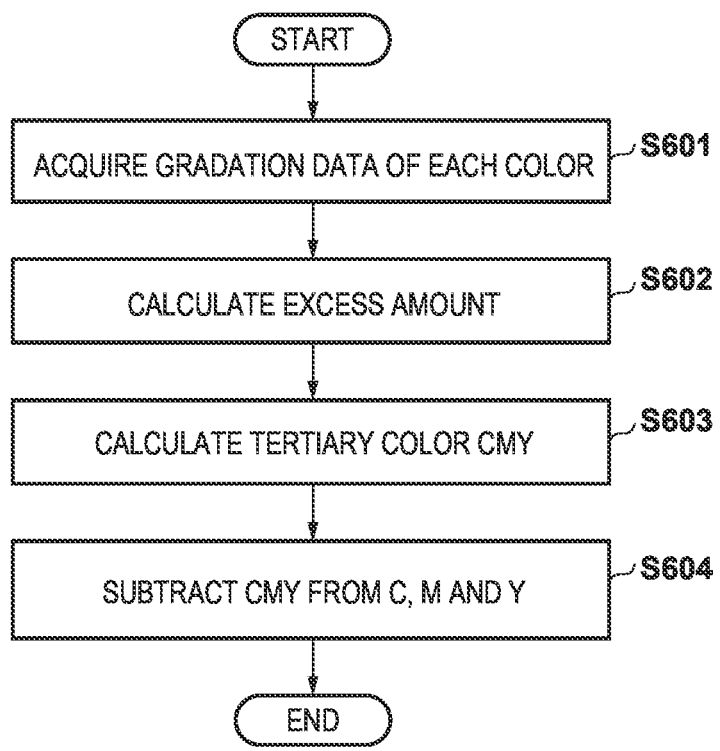
FIG. 6 is a flowchart of conversion (multi-order color conversion) performed by a multi-order color conversion unit 404.

Next, there will be described conversion (multi-order color conversion) performed by the multi-order color conversion unit 404, referring to the flowchart of FIG. 6.

At step S601, the multi-order color conversion unit 404 acquires 12-bit gradation data of C, M, Y, and K output from the normalization unit 403. In the following, description will be provided taking as an example a case where gradation data 1300, 1100, 900, and 2300, respectively representing C, M, Y, and K, have been input as the 12-bit gradation data of C, M, Y, and K.

At step S602, the multi-order color conversion unit 404 determines, according to the following equation (Formula 1), an excess amount Δ from the 12-bit gradation data of C, M, Y, and K acquired at step S601.

$$\Delta = C + M + Y + K - I\_max \quad \text{(Formula 1)}$$

Here, I_max, i.e., the maximum value of the value normalized by the normalization unit 403 is 4095 in the present embodiment. On this occasion, the excess amount Δ is calculated by the Formula 1 such that Δ=1300+1100+900+2300−4095=1505. In other words, at step S602, the multi-order color conversion unit 404 acquires the excess amount Δ as an amount that a total gradation value, which is the sum of the gradation data of the plurality of colors (C, M, Y, and K) used for recording the pixel of interest, has exceeded from a predetermined value.

Next, at step S603, the multi-order color conversion unit 404 determines the tertiary color CMY (12-bit gradation data) from the excess amount Δ, according to the following Formula 2.

$$CMY = \text{Min}(\Delta/2, C, M, Y) \quad \text{(Formula 2)}$$

Here, Min( ) is a function that returns the minimum value among the arguments, and it turns out that, in the case of Formula 2, the minimum value of Δ/2 (half value of Δ), C, M, and Y is set to CMY. Here, when Δ is an odd number, a value after truncating numbers beyond the decimal point is set to CMY. On this occasion, CMY turns out to be CMY=Min(1505/2, 1300, 1100, 900)=752, according to the Formula 2.

Next, at step S604, the multi-order color conversion unit 404 subtracts CMY from C, M, and Y, respectively, to acquire the final C, M, and Y. However, when numbers beyond the decimal point are truncated at step S603, a value 1 is further subtracted from the gradation value of one of the colors. In the present embodiment, Y is assumed to be the color from which the value 1 is subtracted. However, there is a possibility that Y is 0 and, in such a case, a color to be subtracted by 1 is determined in order of Y, M, and C. According to the aforementioned process, the multi-order color data (C, M, Y, K, and CMY) turns out to be as follows:

$$K = 2300$$

$$CMY = 752$$

$$C = 1300 - 752 = 548$$

$$M = 1200 - 752 = 348$$

$$Y = 900 - 752 - 1 = 147$$

Subsequently, the multi-order color conversion unit 404 outputs the multi-order color data determined in the aforementioned manner to the dither processing unit 411.

<Inter-Color Processing>

Figure 5:
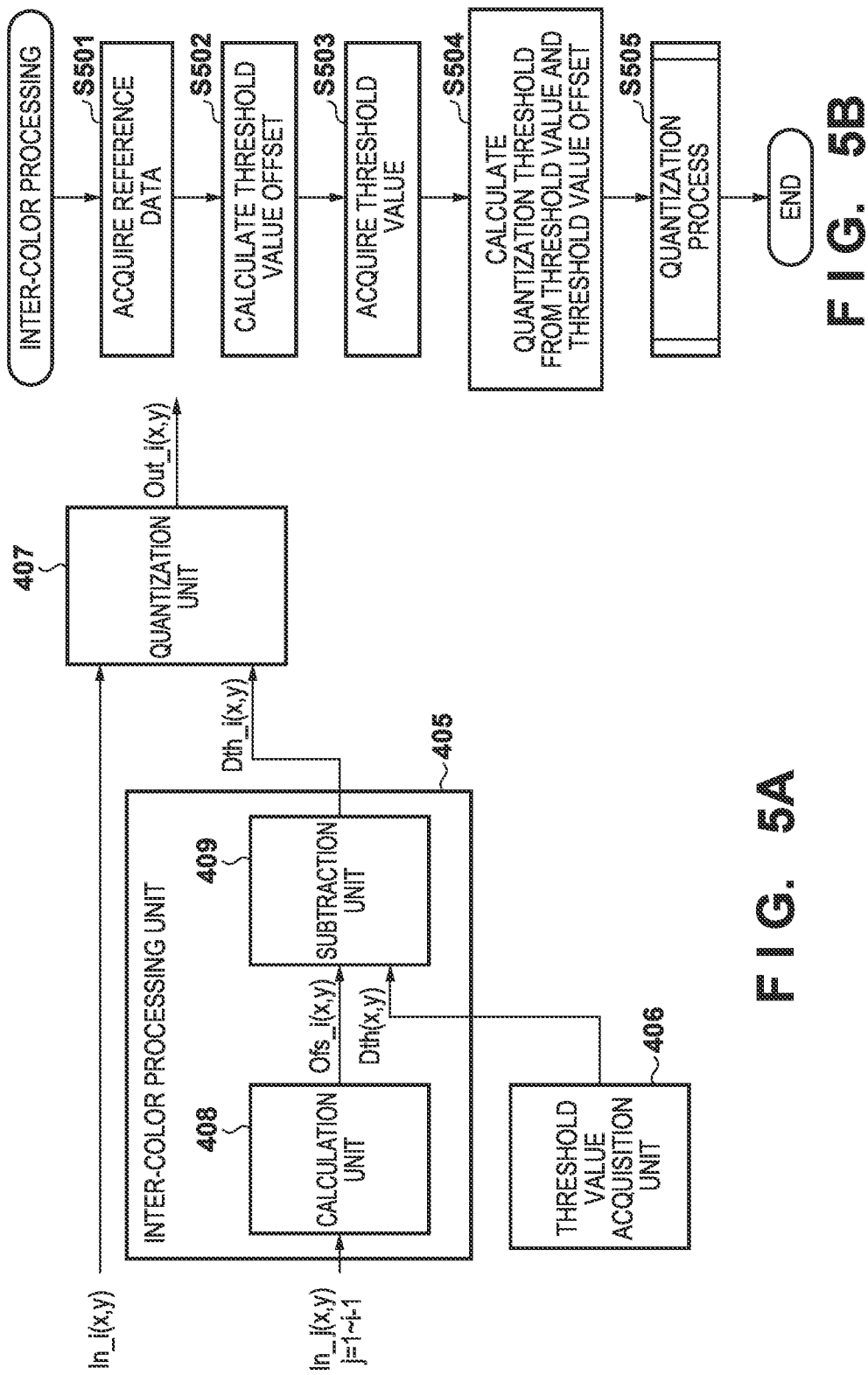
FIG. 5A is a block diagram illustrating a functional configuration example of an inter-color processing unit 405.
FIG. 5B is a flowchart illustrating a process performed by the inter-color processing unit 405 and the quantization process performed by a quantization unit 407.

Next, there will be described the inter-color processing unit 405, referring to FIGS. 5A and 5B. FIG. 5A is a block diagram illustrating a functional configuration example of the inter-color processing unit 405. The process performed by the inter-color processing unit 405 having the functional configuration example illustrated in FIG. 5A; and the quantization process performed by the quantization unit 407 will be described, referring to the flowchart of FIG. 5B.

In the following, description will be provided taking as an example a case where data of the five colors K=2300, CMY=752, C=548, M=348, and Y=147 have been input as multi-order color data to the inter-color processing unit 405 from the multi-order color conversion unit 404.

In FIG. 5A, the i-th (i=1 to 5) multi-order color data among the multi-order color data of the five colors is selected as the data to be processed, the data to be processed being denoted as In_i(x, y). Here, (x, y) indicate a pixel position and are coordinate parameters that the threshold value acquisition unit 406 uses for acquiring a threshold value corresponding to the pixel position of the data to be processed from within the threshold value matrix. In the following, (x, y) may be omitted in the notation for simplicity of explanation.

In addition, FIG. 5A illustrates reference data as In_j(x, y) when the i-th multi-order color data is used as the data to be processed. Here, j is an integer in a range from 1 to i−1. For example, when processing the third multi-order color data In_3, two items In_1 and In_2 become the reference data. Here, In_1 to In_5 are arranged in order of visual prominence (higher density), which is the order of K, CMY, C, M, and Y in the present embodiment.

At step S501, the calculation unit 408 acquires the reference data In_j(x, y) input to the inter-color processing unit 405. Subsequently, at step S502, the calculation unit 408 uses the acquired reference data In_j(x, y) to calculate a threshold value offset Ofs_i(x, y) for data to be processed In_i(x, y), according to the following Formula 3.

$$Ofs\_i(x,y) = \Sigma In\_k(x,y) \quad \text{(Formula 3)}$$

Here, Σ represents the result (total) of summing In_k(x, y) for k=1 to j. Here, Formula 3 is equivalent to the following equations.

$$Ofs\_1(x,y) = 0 \quad \text{(Formula 3-1)}$$

$$Ofs\_2(x,y) = In\_1(x,y) \quad \text{(Formula 3-2)}$$

$$Ofs\_3(x,y) = In\_1(x,y) + In\_2(x,y) \quad \text{(Formula 3-3)}$$

$$Ofs\_4(x,y) = In\_1(x,y) + In\_2(x,y) + In\_3(x,y) \quad \text{(Formula 3-4)}$$

$$Ofs\_5(x,y) = In\_1(x,y) + In\_2(x,y) + In\_3(x,y) + In\_4(x,y) \quad \text{Formula 3-5}$$

Next, at step S503, a subtraction unit 409 acquires, from the threshold value acquisition unit 406, a threshold value Dth (x, y) corresponding to the data to be processed In_i(x, y). Then, at step S504, the subtraction unit 409 subtracts the threshold value offset Ofs_i(x, y) calculated by the calculation unit 408 from the threshold value Dth (x, y) acquired from the threshold value acquisition unit 406, and determines the subtraction result to be a quantized threshold value Dth_i(x, y).

$$Dth\_i(x,y) = Dth(x,y) - Ofs\_i(x,y) \quad \text{(Formula 4)}$$

On this occasion, when Dth_i(x, y) turns out to be negative, Dth_max+1 is added thereto to update the quantized threshold value Dth_i(x, y). The foregoing keeps the quantized threshold value Dth_i in a range between 0 and Dth_max.

When $Dth\_i(x,y) < 0$, $$Dth\_i(x,y) = Dth\_i(x,y) + (Dth\_max+1) \quad \text{(Formula 5)}$$

At step S505, the quantization unit 407 acquires, from the subtraction unit 409, the quantized threshold value Dth_i(x, y) determined according to Formula 4 or Formula 5. Subsequently, the quantization unit 407 compares the data to be processed In_i(x, y) with the quantized threshold value Dth_i(x, y). Subsequently, in accordance with the result of comparison, the quantization unit 407 outputs whether a dot at the pixel position (x, y) is "to be recorded (1)" or "not to be recorded (2)", as quantization data Out_i(x, y) of the data to be processed In_i(x, y).

For example, when In_i(x, y)≥Dth_i(x, y), the quantization unit 407 outputs "to be recorded (1)" as the quantization data Out_i(x, y) of the data to be processed In_i(x, y). When, on the other hand, In_i(x, y)<Dth_i(x, y), the quantization unit 407 outputs "not to be recorded (0)" as the quantization data Out_i(x, y) of the data to be processed In_i(x, y).

Figure 7A:
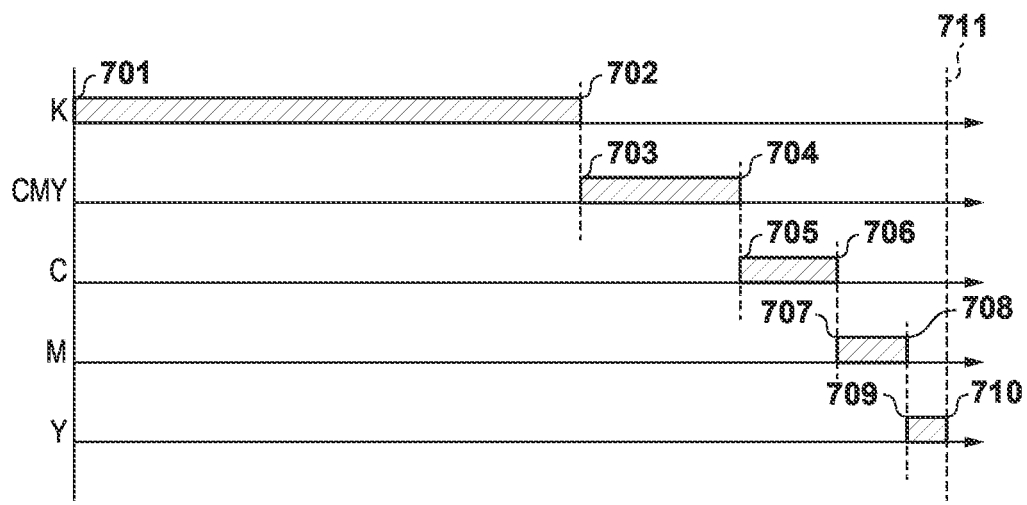
FIGS. 7A and 7B are explanatory diagrams of threshold value ranges.

FIG. 7A illustrates ranges of threshold values determined "to be recorded (1)" among a plurality of threshold values 0 to Dth_max arranged in the threshold value matrix, when In_1 to In_5 is input. The horizontal axis represents the threshold value Dth, with the reference numeral 711 indicating Dth_max (maximum of the threshold values included in the dither matrix). Each line indicates a range of a threshold value in which the dots are arranged.

In the present example, Ofs_1=0 holds for K according to Formula 3-1. Therefore, pixel positions corresponding to threshold values of 0 to In_1-1 (701 to 702) are set "to be recorded (1)". Similarly, Ofs_2=In_1 holds for CMY according to Formula 3-2, and In_1 to In 1+In_2-1 (703 to 704) are set "to be recorded (1)". Similarly, Ofs_3=In 1+In_2 holds for C according to Formula 3-3, and In 1+In_2 to In 1+In 2+In_3-1 (705 to 706) are set "to be recorded (1)". Similarly, Ofs_4=In 1+In 2+In_3 holds for M according to Formula 3-4, and In 1+In 2+In_3 to In 1+In 2+In 3+In_4−1 (707 to 708) are set "to be recorded (1)". Similarly, Ofs_5=In 1+In 2+In 3+In_4 holds for Y according to Formula 3-5, and In_1+In_2+In_3+In_4 to In_1+In_2+In_3+In_4+In_5−1 (709 to 710) are set "to be recorded (1)".

Therefore, with inter-color processing, the quantized threshold value Dth_i inherent to each color is determined by setting values input to each other as offset values, while using a common threshold value matrix. Subsequently, by using the newly calculated quantized threshold value Dth_i in the quantization process, dots can be arranged so that a dot arrangement pattern with a mixture of a plurality of colors has blue noise characteristics.

<Multi-Order Color Integration Process>

Next, an operation of a multi-order color integration unit 412 will be described. The multi-order color integration unit 412 integrates quantization data of the five colors, i.e., C, M, Y, K, and CMY, output from the quantization unit 407, into quantization data of C, quantization data of M, quantization data of Y, and quantization data of K.

Specifically, the multi-order color integration unit 412 establishes, as the final quantization data of C, the sum (logical addition) of the quantization data of C and the quantization data of the tertiary color CMY, CMY representing superimposed dots of C, M, and Y. Similarly, the multi-order color integration unit 412 establishes, as the final quantization data of M, the sum (logical addition) of the quantization data of M and the quantization data of the tertiary color CMY. Similarly, the multi-order color integration unit 412 establishes, as the final quantization data of Y, the sum (logical addition) of the quantization data of Y and the quantization data of the tertiary color CMY.

Figure 7B:
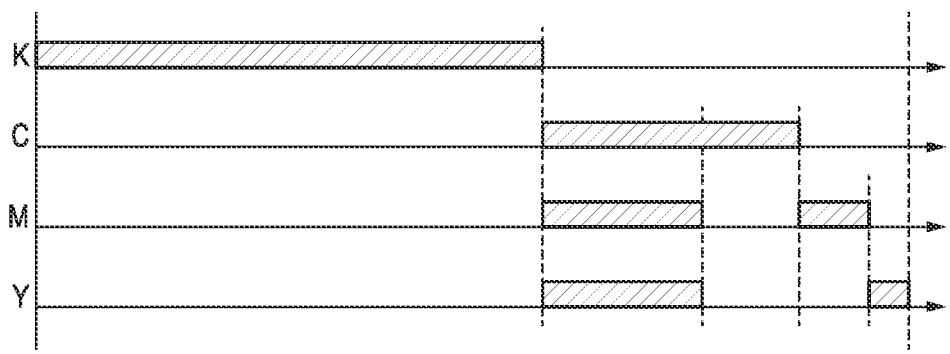

FIG. 7B illustrates ranges of threshold values determined "to be recorded (1)" among a plurality of threshold values 0 to Dth_max arranged in the threshold value matrix as a result of integrating quantization data 2300 of K, quantization data 752 of CMY, quantization data 548 of C, quantization data 348 of M, and quantization data 147 of Y into quantization data of C, quantization data of M, quantization data of Y, and quantization data of K.

Here, after the multi-order color integration process (step S304), the multi-order color integration unit 412 performs, at step S305, an index development process on respective integrated quantization data of C, M, Y, and K to determine a dot arrangement pattern corresponding to pixel position (x, y) for C, M, Y, and K, respectively. In other words, the CPU 211 of the printer 100 determines a dot arrangement pattern in which dots are not arranged for a pixel whose quantization data is "0", and determines, for a pixel whose quantization data is "1", a dot arrangement pattern corresponding to the level value corresponding to the pixel. The number (size) of dots to be recorded in the pixel position (x, y) of a pixel whose quantization data is "1" is set to a number (size)

corresponding to the level value such as, for example, one dot (or small dot) when the level value of the pixel is 1, and 2 dots (or large dot) when the level value of the pixel is 2. Accordingly, it is possible to determine a dot arrangement pattern for C, M, Y, and K, respectively.

Effect of Present Embodiment

Figure 8A:
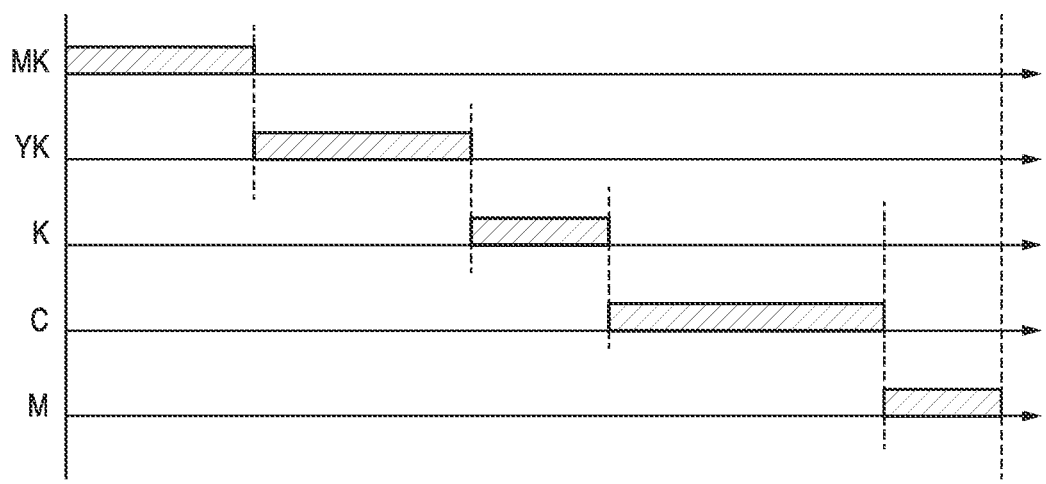
FIGS. 8A and 8B are explanatory diagrams of threshold value ranges.
Figure 8B:
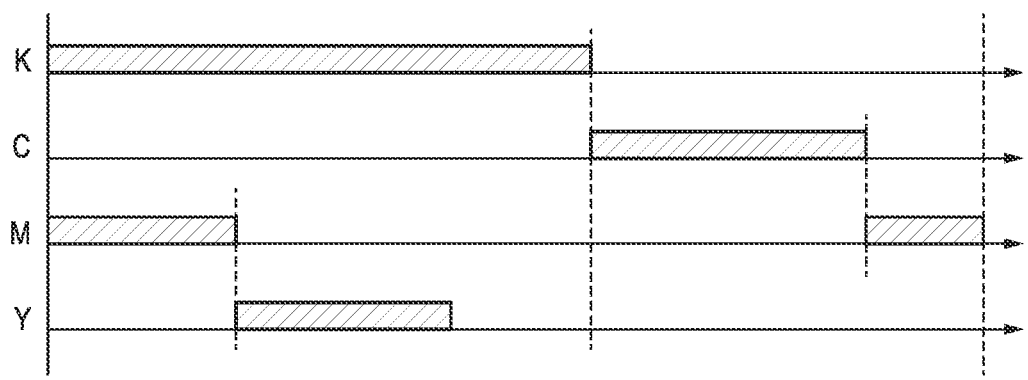

Next, an effect of the present embodiment will be described. FIG. 8B illustrates a result of a case where a conventional inter-color processing is performed on respective gradation data (1300, 1100, 900, 2300) of C, M, Y, and K, without performing the aforementioned multi-order color conversion. The order of processing is K, C, M, and Y. FIG. 8A illustrates the result of FIG. 8B using superimposed dots of multi-order colors.

As a result of performing quantization in order of K, C, M, and Y while shifting the threshold value, the threshold values of ink colors M and Y come around to overlap with K-dots, when the total value of each ink color has exceeded the maximum value of the threshold. On this occasion, ink colors M and Y overlapping with ink color K are affected by K, resulting in substantially achromatic color development. On the other hand, ink colors C and M recorded without being superimposed are not affected by K. As a result, the color shifts toward blue as a whole.

Figure 9A:
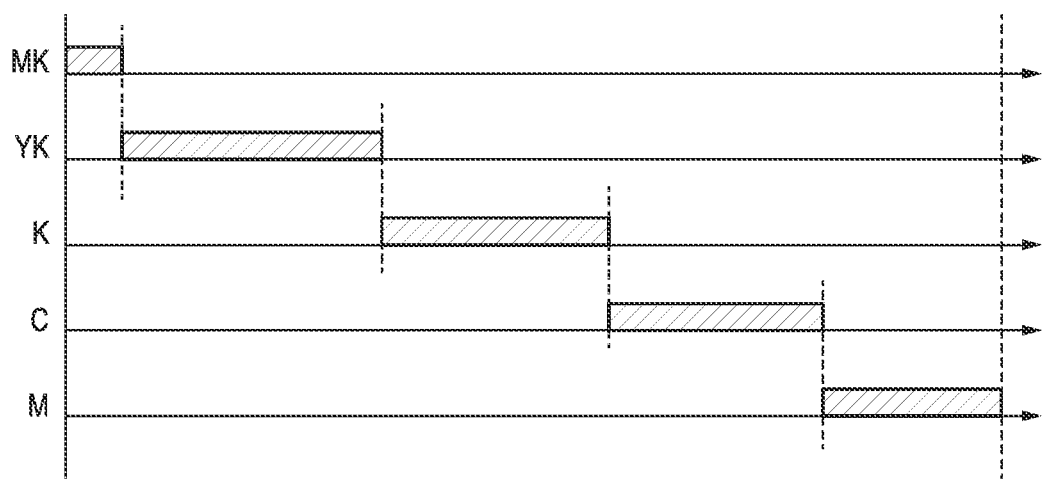
FIGS. 9A and 9B are explanatory diagrams of threshold value ranges.
Figure 9B:
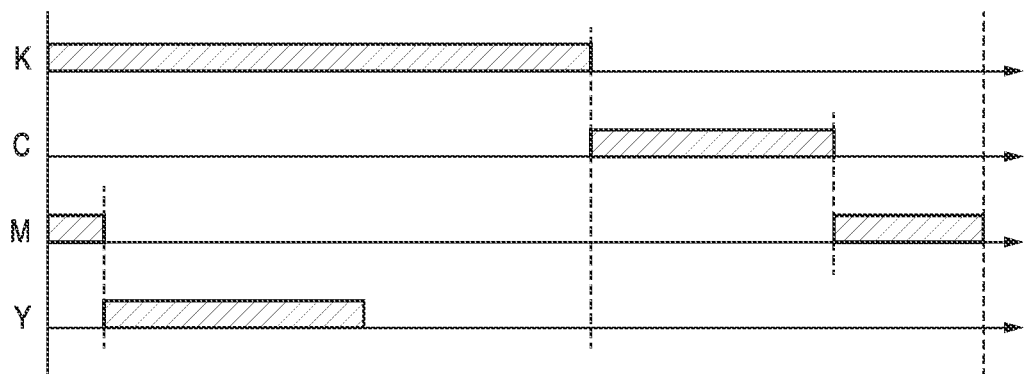

Next, it is considered to adjust the amount of C, M, and Y in response to the color shift toward blue. FIGS. 9A and 9B illustrate the result of reducing the amount of C and M, and increasing the amount of Y in order to reduce blueness, so that respective gradation data of C, M, Y, and K turn out to be 1100, 900, 1100, and 2300. In comparison with FIGS. 8A and 8B, it can be seen that, in spite of the reduced amount of M, the number of M-dots that do not overlap with ink color K increases. Additionally, in spite of the increased amount of Y, all of Y overlaps with K and turns out to be substantially achromatic. Therefore, unintended color shift toward magenta may occur. As such, conventional quantization of inter-color processing makes the relation between ink amount and color development complicated, and therefore it is difficult to suppress color shift.

On the other hand, superimposition of dots with ink color K has not occurred in FIG. 7A illustrating the result of the present embodiment. In addition, the numbers of C-, M- and Y-dots are (548, 348, 147), maintaining the difference in CMY (1300, 1100, 900) of the input color signal. In other words, an achromatic tertiary color CMY is generated while maintaining the intended color tone. As a result, it is possible to suppress color shift occurring in conventional inter-color processing.

As has been described above, the present embodiment allows for suppressing color shift by generating achromatic dots preferentially when overlapping of dots occurs, in quantization that suppresses overlapping between inks colors.

Second Embodiment

Figure 10A:
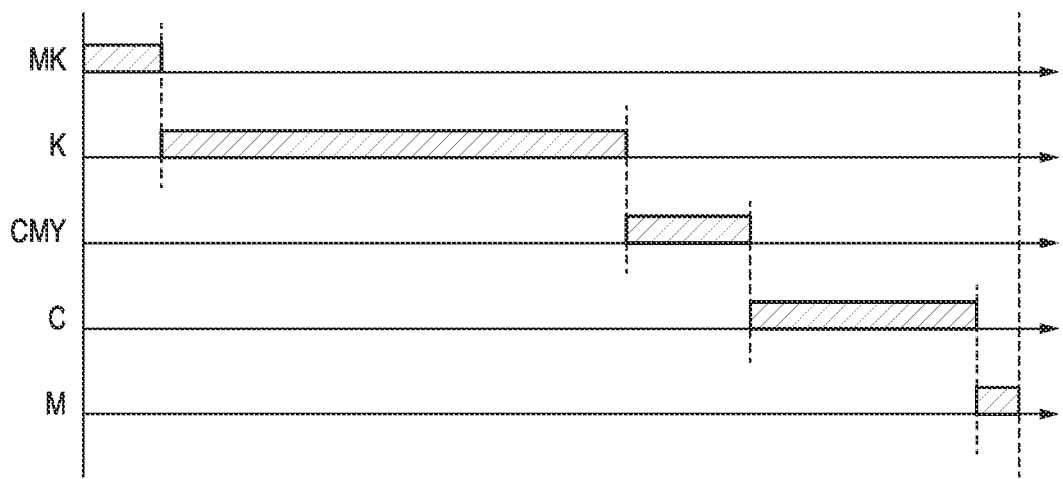
FIGS. 10A and 10B are explanatory diagrams of threshold value ranges.
Figure 10B:
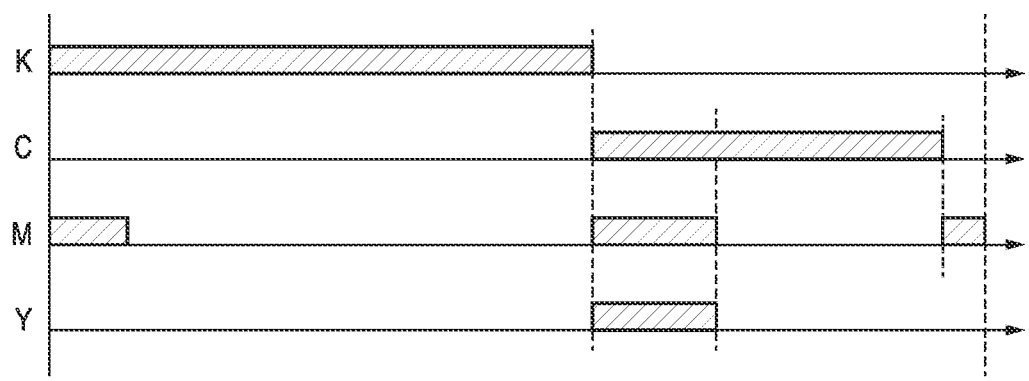

In the present and subsequent embodiments, only the difference from the first embodiment will be described, assuming that the rest are similar to the first embodiment unless otherwise stated. In the first embodiment, an example has been described in which the tertiary color CMY is calculated based on the excess amount. However, there may be a case where the color shift is not sufficiently resolved, depending on the ratio of input C, M, and Y. FIGS. 10A and 10B illustrates a result of multi-order color conversion in a case where respective gradation data of C, M, Y, and K are set to be 1600, 1100, 600, and 2300 in the first embodiment.

Formula 1 gives Δ=1600+1100+600+2300−4095=1505, and Formula 2 gives CMY=Min(1505/2, 1600, 1100, 600)=600, and therefore the final multi-order color data turns out to be:

$K=2300$ $CMY=600$ $C=1600-600=1000$ $M=1100-600-1=499$ $Y=600-600=0$

The sum of the aforementioned multi-order color data of the five colors turns out to be 4399, which exceeds the value 4094 of Dth_max. As a result, some of the M-dots are superimposed with ink color K, as illustrated in FIG. 10B. Therefore, in the present embodiment, an example will be described that allows the multi-order color conversion unit 404 to generate all the multi-order color data, without limited to CMY.

<Multi-Order Color Conversion Process>

FIG. 11 illustrates combinations of multi-order color data that can be generated when there are four types of ink colors, namely, CMYK. There are four combinations of primary colors, namely, C, M, Y, and K, and six combinations of secondary colors, namely, CM, CY, CK, MY, MK, and YK. In addition, there are four combinations of tertiary colors, namely, CMY, CMK, CYK, and MYK, and there is only one combination of quaternary color, namely, CMYK. Here, a zero-order color denoted by W is paper white with no ink applied thereto.

Figure 12:
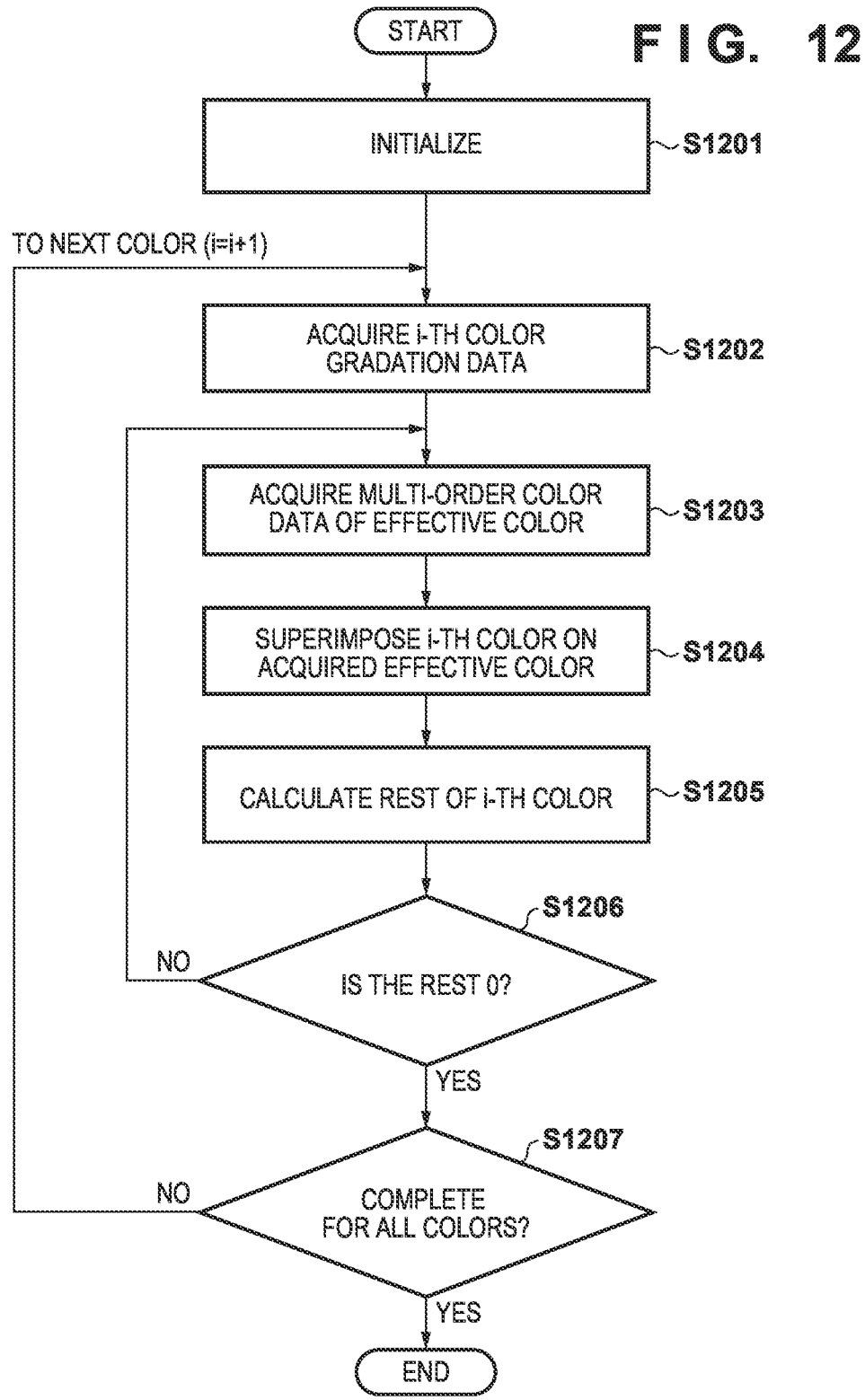
FIG. 12 is a flowchart of a multi-order color conversion process.

In the following, there will be described a multi-order color conversion process according to the present embodiment, referring to FIGS. 12 and 13. FIG. 12 is a flowchart of the multi-order color conversion process according to the present embodiment. FIG. 13 illustrates the progress and results of multi-order color conversion, in which multi-order color data from the zero-order color W to the quaternary color CMYK are listed from left to right in order of priority.

In principle, the present embodiment sets the priority in ascending order of density (descending order of brightness) of multi-order colors when being superimposed. However, achromatic color CMY is provided with a higher priority than chromatic colors MY, CY, and CM. In the following, description is provided taking as an example for a case where respective gradation data of K, C, M, and Y input to the multi-order color conversion unit 404 are 2300, 1600, 1100, and 600.

At step S1201, the multi-order color conversion unit 404 performs an initialization process. In the initialization process, only W among the multi-order color data is set to the maximum value of 4095, and all the other values are cleared to 0. A row 1301 in FIG. 13 represents an initialized state. Additionally, in the initialization process, a variable i used in the following processing is initialized to 1.

Next, at step S1202, the multi-order color conversion unit 404 acquires, as the data to be processed (input value), the gradation data of the i-th color (i=1 to 4) from the top of K, C, M, and Y.

Next, at step S1203, the multi-order color conversion unit 404 acquires the multi-order color data of an effective color, referring to the order of priority. Here, an effective color refers to a color set to a value of one or higher in FIG. 13. However, a color that cannot be superimposed with the i-th color ink to be processed is excluded from the effective colors. It is assumed in the present embodiment that identical ink colors cannot be superimposed and when, for example, the gradation data of K is selected as the data to be processed, K, YK, MK, MYK, CYK, CMK, and CMYK are excluded from the effective colors. In the example of FIG. 13, only W being set to a value "4095" becomes the effective color, when the gradation data of K is selected as the data to be processed after the initial state indicated by the row 1301.

At step S1204, the multi-order color conversion unit 404 uses the data to be processed acquired at step S1202 and the multi-order color data acquired at step S1203 to superimpose the color of the data to be processed (the i-th color from the top of K, C, M, and Y) on the effective color of the multi-order color data. A row 1302 in FIG. 13 indicates a result of selecting the gradation data of K as the data to be processed after the initial state indicated by the row 1301, and superimposing the color of the data to be processed on the effective color of the multi-order color data acquired at step S1203. As indicated by the row 1302, superimposing the color K=2300 of the data to be processed on the effective color W=4095 of the multi-order color data acquired at step S1203 results in W=4095−2300=1795 and K=2300.

Next, at step S1205, the multi-order color conversion unit 404 determines the rest of the data to be processed acquired at step S1202, which are not superimposed on the effective color. Referring to the row 1302, all of K (2300) has been superimposed on W and the rest turns out to be 0 in this case.

At step S1206, the multi-order color conversion unit 404 determines whether or not the rest of the data acquired at step S1205 is 0. When, as a result of the determination, the rest of the data acquired at step S1205 is 0, the process flow proceeds to step S1207, or the process flow proceeds to step S1203 when the rest of the data acquired at step S1205 is not 0.

At step S1207, the multi-order color conversion unit 404 determines whether or not the gradation data of all the colors K, C, M, and Y have been acquired at step S1202 as the data to be processed. When, as a result of the determination, the gradation data of all the colors K, C, M, and Y have been acquired at step S1202 as the data to be processed, the multi-order color conversion unit 404 outputs the multi-order color data of each color to the dither processing unit 411, and terminates the process according to the flowchart of FIG. 12. When, on the other hand, there remains gradation data of a color among K, C, M, and Y which has not been acquired at step S1202 as the data to be processed, the value of the variable i is incremented by one and the process flow proceeds to step S1202.

A row 1303 in FIG. 13 indicates the result of processing C, which is the i-th, i.e., the second color. C is to be superimposed on W, which is the effective color with the highest priority. Since W has a value of 1795, the entirety of C is superimposed on W, which results in C being 1600 and W being 1795−1600=195. Since the rest of C is 0, the process flow proceeds to step S1207 according to the determination at step S1206, and returns to step S1202 with M, which is i=3, i.e., the third color to be processed.

A row 1304 in FIG. 13 indicates a result of processing M, which is the i-th, i.e., the third color. M is first superimposed on W, which is the effective color with the highest priority. Since W has a value of 195, it is impossible to superimpose the entirety of M on W. As a result of superimposing 195 of M on W, W becomes 0, with the rest of M being 1100−195=905. Since the rest of M is not 0, the process flow returns to step S1203 according to the determination at step S1206. Acquiring the effective color for M again at step S1203 leaves C as the effective color with the highest priority, and therefore 905 of C is superimposed on M. As a result, CM turns out to be 905, updating C to 1600−905=695.

Similarly, a row 1305 in FIG. 13 indicates the result of processing Y, which is the i-th, i.e., the fourth color. Y is superimposed with CM being the effective color with the highest priority. As a result, CMY turns out to be 600 and CM is updated to 905−600=305.

Processing of all the colors of the present embodiment is completed as has been described above, and the multi-order color data of K=2300, CMY=600, CM=305, C=695, and M=195 are output to the dither processing unit 411.

Effect of Present Embodiment

Figure 14A:
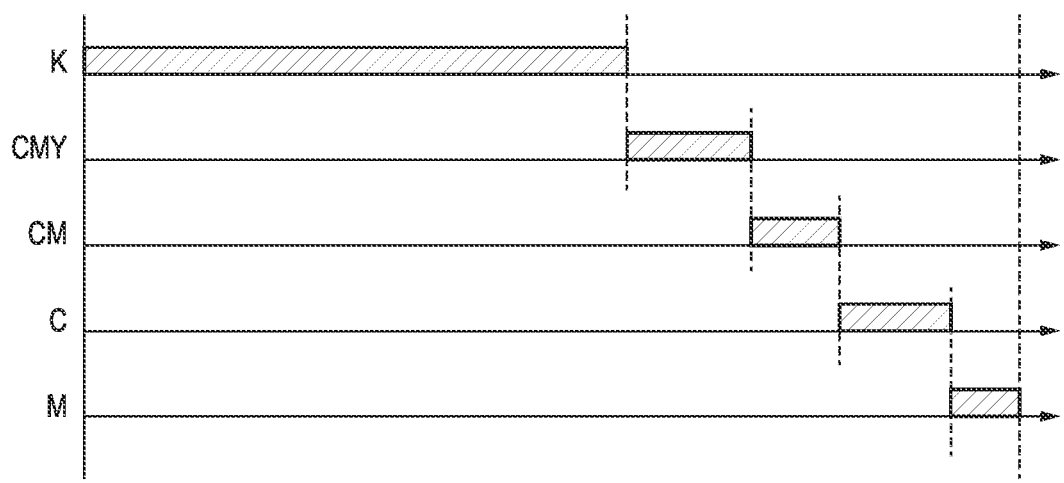
FIGS. 14A and 14B are explanatory diagrams of threshold value ranges.
Figure 14B:
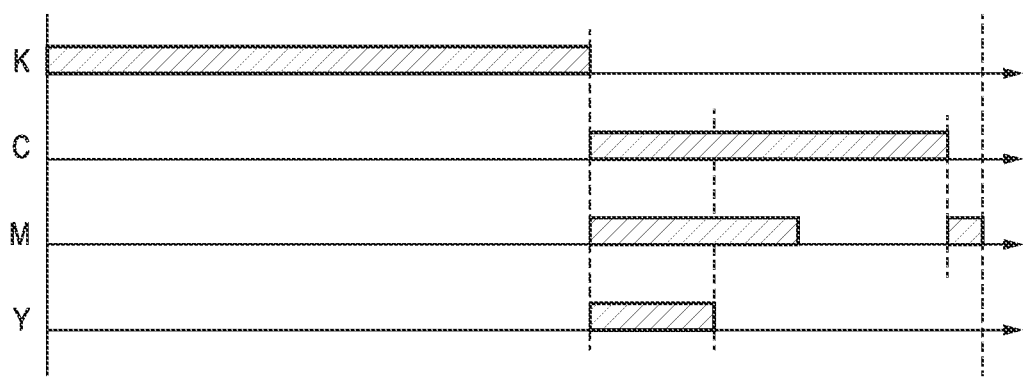

FIG. 14A illustrates a result of the present embodiment. Here, the order of processing by the inter-color processing unit 405 is the order of visual prominence (higher density). In the present embodiment, the aforementioned order is K, CM, CMY, C, and M.

Unlike the results illustrated in FIGS. 10A and 10B, it turns out that the substantially achromatic secondary color MK is not generated, and the chromatic color CM is generated. In other words, with the intended color tone being maintained, it is possible to suppress the color shift caused by the inter-color processing.

As has been described above, the present embodiment allows for suppressing color shift even in a case where the ratio of input C, M, and Y is deviated when overlapping of dots occurs, in quantization that suppresses overlapping between inks colors.

Modification Example

In the aforementioned embodiments, an example using four ink colors C, M, Y, and K has been described. However, the type and number of ink colors are not limited to the aforementioned embodiments described above, and ink colors such as, for example, Gray (Gr), Light cyan (Lc), and Light magenta (Lm) may also be used as high-brightness light-color ink. In this case, it is desirable to raise the priority of the achromatic color Gr, or the achromatic tertiary color LcLmY generated by combining Lc, Lm, and Y.

In addition, it is also possible to use particular color ink such as Red (R), Green (g), and Blue (b) at the same time. Similarly in this case, color shift can be suppressed by raising the priority of the achromatic secondary colors CR, MG, and YB.

In addition, although the aforementioned embodiment controls overlapping of colors using the priority of effective colors, overlapping of dots can be controlled similarly to the first embodiment according to the following equation.

For example, let us assume that respective gradation data of K, C, M, and Y are 2300, 1600, 1100, 600. In this case, Formula 1 gives Δ=1600+1100+600+2300−4095=1505 and Formula 2 gives CMY=Min(1505/2, 1600, 1100, 600)=600, and therefore the multi-order color data turns out to be as follows:

$K=2300$ $CMY=600$ $C=1600-600=1000$ $M=1100-600-1=499$ $Y=600-600=0$

With the Dth_max excess amount 42 being 4399−4095=304 at this time point, the value of the secondary color CM is calculated from Formula 6:

$$CM=\mathrm{Min}(\Delta 2, C, M) \quad \text{(Formula 6)}$$

which gives CM=Min(304, 1000, 499)=304, and the final multi-order color data turns out to be as:

$$K=2300$$

$$CMY=600$$

$$CM=304$$

$$C=1600-600-304=696$$

$$M=1100-600-1-304=195$$

$$Y=600-600=0$$

Example of Performing Dot Pruning on Output Image

In addition, although an example has been described in the aforementioned embodiments in which inter-color processing is performed by subtracting an offset amount from the threshold, the method of inter-color processing is not limited to the aforementioned embodiments. For example, the two instances of inter-color processing described below provide an identical result. Process 1 is one that is described in the aforementioned embodiments. Process 2 multiplies the input value with an offset value to quantize the former, and subsequently subtracts the quantization result of the first color.

$$Dth\_2(x,y)=Dth(x,y)-Ofs\_2(x,y) \quad \text{(Process 1)}$$

If $In\_2 > Dth\_2(x,y)$:

Out_2=1

Else:

Out_2=0

$$In\_2(x,y)=In\_2(x,y)+Ofs\_2(x,y) \quad \text{(Process 2)}$$

If $In\_2 > Dth(x,y)$:

Out_2=1

Else:

Out_2=0

Out_2=Out_2−Out_1

Although there is a disadvantage with the process 2 in that it refers to the output result of the other color (Out1) and therefore cannot perform parallel processing, both processes can acquire equivalent results.

Example of Implementation with Error Diffusion

In addition, although an example has been described in the aforementioned embodiments in which a dither process according to a threshold value matrix is used as the quantization process, the method of quantization process is not limited to the aforementioned embodiments. For example, in a known error diffusion, equivalent inter-color processing can be realized by adding an offset to the threshold value of the second color in a pixel with the quantization result of the first color being "to be recorded (1)". However, the aforementioned case also refers to the output result (Out1) of the other color, and therefore it is impossible to perform parallel processing.

Further, although the aforementioned embodiments have been described using a serial recording apparatus as illustrated in FIGS. 1A and 1B, the aforementioned embodiments can also support full-line recording apparatuses.

Here, the numerical values, processing timing, processing order, type and number of data, or the like used in the foregoing description are provided as an example for a specific description, and are not intended to limit the invention to such an example.

In addition, a part or all of the aforementioned embodiments and variations may be used in combination as appropriate. In addition, a part or all of the aforementioned embodiments and variations may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-124642, filed Jul. 21, 2020, which is hereby incorporated by reference herein in its entirety.

What is claimed is:

1. An image processing apparatus comprising:
  one or more processors; and
  one or more memories storing instructions which, when executed by the one or more processors, cause the image processing apparatus to function as:
    a first generating unit configured to generate gradation data corresponding to an achromatic color generated by combining two or more colors among a plurality of colors, for an excess amount of a total gradation value exceeding a predetermined value, the total gradation value being a sum of gradation values of the plurality of colors used for recording a pixel of interest, and generate gradation data corresponding to the plurality of colors, based on the generated gradation data corresponding to the achromatic color; and a second generating unit configured to quantize the gradation data generated by the first generating unit, and generate data to control recording of dots corresponding to the pixel of interest, wherein the predetermined value is a gradation value indicating whether or not to record the dots in an overlapping manner, in case that the dots corresponding to the total gradation value are recorded, and the first generating unit generates gradation data in ascending order of density of colors when being superimposed.

2. The image processing apparatus according to claim 1, wherein the first generating unit generates the gradation data corresponding to the plurality of colors, by acquiring a minimum value among the gradation values of the plurality of colors and a value according to the excess amount, and by subtracting the minimum value from the gradation values of the plurality of colors.

3. The image processing apparatus according to claim 2, wherein the value according to the excess amount is a half value of the excess amount.

4. The image processing apparatus according to claim 1, wherein the first generating unit preferentially generates the gradation data corresponding to the achromatic color.

5. The image processing apparatus according to claim 1, wherein the second generating unit calculates a threshold value to be used for quantizing target gradation data among gradation data generated by the first generating unit, based on a sum of gradation data having higher density than the target gradation data among the gradation data generated by the first generating unit.

6. The image processing apparatus according to claim 1, wherein the gradation data corresponding to the achromatic color is achromatic gradation data having cyan, magenta and yellow dots recorded in a superimposed manner.

7. The image processing apparatus according to claim 1, wherein the gradation data corresponding to the achromatic color is achromatic gradation data having dots of high-brightness light cyan, high-brightness light magenta, and yellow recorded in a superimposed manner.

8. The image processing apparatus according to claim 1, wherein the gradation data corresponding to the achromatic color includes one of: achromatic gradation data having red and cyan dots recorded in a superimposed manner; achromatic gradation data having green and magenta dots recorded in a superimposed manner; and achromatic gradation data having blue and yellow dots recorded in a superimposed manner.

9. The image processing apparatus according to claim 1, wherein the instructions, when executed by the one or more processors, cause the image processing apparatus to further function as a unit configured to control recording on a recording medium, based on data generated by the second generating unit.

10. An image processing method performed by an image processing apparatus, comprising:

generating gradation data corresponding to an achromatic color generated by combining two or more colors among a plurality of colors, for an excess amount of a total gradation value exceeding a predetermined value, the total gradation value being a sum of gradation values of the plurality of colors used for recording a pixel of interest, and generating gradation data corresponding to the plurality of colors, based on the generated gradation data corresponding to the achromatic color; and quantizing the gradation data generated, and generating data to control recording of dots corresponding to the pixel of interest, wherein the predetermined value is a gradation value indicating whether or not to record the dots in an overlapping manner, in case that the dots corresponding to the total gradation value are recorded, and gradation data is generated in ascending order of density of colors when being superimposed.

11. A non-transitory computer-readable storage medium storing a computer program that causes a computer to perform an image processing method comprising:

generating gradation data corresponding to an achromatic color generated by combining two or more colors among a plurality of colors, for an excess amount of a total gradation value exceeding a predetermined value, the total gradation value being a sum of gradation values of the plurality of colors used for recording a pixel of interest, and generate gradation data corresponding to the plurality of colors, based on the generated gradation data corresponding to the achromatic color; and quantizing the gradation data generated, and generating data to control recording of dots corresponding to the pixel of interest, wherein the predetermined value is a gradation value indicating whether or not to record the dots in an overlapping manner, in case that the dots corresponding to the total gradation value are recorded, and gradation data is generated in ascending order of density of colors when being superimposed.

* * * * *